Feb. 11, 1969 R. SIEGEMUND 3,426,977

MAGNETIC TAPE MAGAZINE

Filed Jan. 17, 1967

INVENTOR

Richard Siegemund

By Ernest G. Montague

Attorney 3,426,977

MAGNETIC TAPE MAGAZINE

Richard Siegemund, St. Georgen, Germany, assignor to Dual Gebruder Steidinger, St. Georgen, Black Forest, Germany, a corporation of Germany Filed Jan. 17, 1967, Ser. No. 609,835
Claims priority, application Germany, Jan. 26, 1966, St 24,902
U.S. Cl. 242—55.13 8 Claims
Int. Cl. G11b 15/43

ABSTRACT OF THE DISCLOSURE

The present invention is concerned with a magnetic tape magazine which comprises a take-up and a feeding reel, which reels are disposed in a single plane. Each of the reels includes a reel body. A brake band surrounds each reel body and one end of the brake band is secured to the magazine and the other end of the brake band is connected with a spring with pretension of the latter. Finally, the sense of direction of the brake relative to the periphery of the reel is chosen such that the direction taken from the securing point to the spring engaging point of the brake band coincides with the direction of rotation of the reel body during unwinding of the magnetic tape disposed thereon.

The present invention relates to a magnetic tape magazine, commonly called cassette, in which a take-up reel and a feed reel are disposed adjacent each other in lying position.

In order to prevent that the reels rotate in the magazine removed from the device, so that no tape loops can be formed, brake- or locking-devices are provided in known magazines. These arrangements are put into and out of operational position, respectively, by corresponding sensing members during removal and insertion, respectively, of the magazine into the device. These sensing devices require a certain expenditure and render partly more difficult the insertion process of the magazine into the device.

In comparatively small magazines, the conditions pertaining to a loop formation and the danger connected therewith are more favorable. In known magazines, it will suffice that the natural friction of the reels in the magazine prevents the loop formation to a certain degree.

Since, in case of small magazines, mostly small and thus movable devices are used, which are fed mostly by battery operated motors, the friction of the spool in the magazines amounts in these devices to an appreciable drawback. It would be possible though to reduce the friction and to use the above-mentioned control brakes. Aside from the expenditure required therefor, the arrangement of the magazines brings about particularly in small magazines, constructive difficulties.

It is, therefore, one object of the present invention to provide a magnetic tape magazine which avoids the above-stated drawbacks of the known structures.

It is another object of the present invention to provide a magnetic tape magazine, wherein each of the reels is equipped with a band brake, the brake band of which is arranged such that in the feeding reel the direction of the friction pull in the brake band points from its rigid to the resilient suspended end.

Since the band brake is effective in one direction appreciably stronger than in the other direction, the loss due to the friction is about half as great as in a conventional friction brake, because during rewinding only a friction of always one spool is effective, namely that of the feeding reel. The securing against loop formation in the removed magazine is, however, present to its full extent, because a loop formation can take place only in one direction of rotation, namely in the feeding direction.

It is still another object of the present invention to provide a particularly simple embodiment of the present invention, which resides in the fact that a brake band is disposed about both reels, the ends of the spools leading to one end point and in the center of the band is disposed a spring operating substantially at a right angle to the direction of the band.

In accordance with this arrangement, only one spring is required for both brakes and in particular only two points of tying together on the brake band.

It is still another object of the present invention to provide a magnetic tape magazine, wherein one brake band is disposed around both reels, and the ends are connected with the start and the end of a pull spring and the center portion with an immovable point.

With these and other objects in view which will become apparent in the following detailed description, the present invention will be clearly understood in connection with the accompanying drawing, in which.

Figure 1:
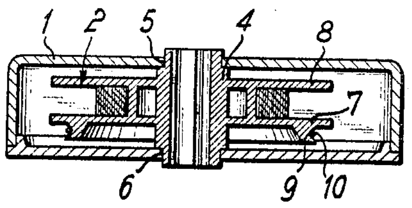
FIGURE 1 is an axial section of a magnetic tape magazine through a reel.
Figure 2:
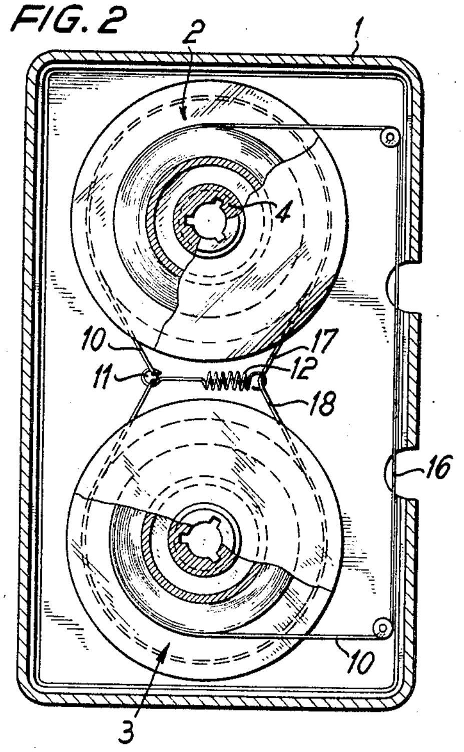
FIG. 2 is a top plan view of the magazine.

Referring now to the drawing, two reels 2 and 3 are disposed adjacent each other in a magazine housing 1. The center part 4 of the reel 2 is mounted for rotation in bores 5 and 6 of the magazine walls such, that the reel 2 engages the magazine only within the range of these bearing locations. The same applies also to the reel 3.

The reels 2 and 3 are equipped with parallel flanges 7 and 8 which define therebetween a recording carrier winding region in which a recording carrier 16, e.g., a magnetic tape, is wound on the reels. One of the reel flanges 7 and 8 has an annular groove 9, on the side of the flange outside the recording carrier winding region, in which a brake band or thread 10 is guided. This thread 10 is anchored with both ends on a pin 11 of the magazine and surrounds both reels 2 and 3. It is tensioned by a spring 12 engaging in the center, which spring 12 is likewise anchored on the pin 11.

Figure 3:
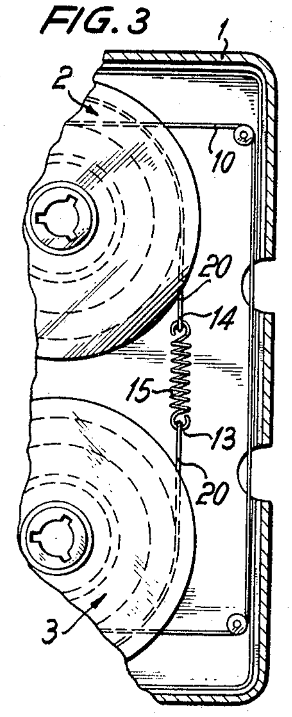
FIG. 3 is a fragmentary elevation of another embodiment of the device of the present invention.

Referring now to FIG. 3, another embodiment of the thread position and tension means is provided by suspending the thread 20 with both its ends 13 and 14 at a spring 15. In this case, the center portion of the thread is anchored on the pin 11.

If the magazine is moved such that, for instance, the reel 2 due to its mass inertance would tend to rotate relative to the magazine in clockwise direction, then such movement is prevented by a cable brake. A similar movement of the reel 3 would only tension the recording carrier 16. If the recording carrier 16 rewinds in the same direction by movement by means of a drive from the device over the reel medium portion, the friction of the thread 10 on the reel 2 operates though in the same manner, namely in accordance with the known formula: thread resting tension times $e^{\mu a}$. The portion of thread engaging the securing point 11 is tensioned additionally for this amount, whereby the thread piece 17 engaging the spring attacking point retains its resting position, since the position of the spring has not changed. Also the thread member 18 leading to the reel 3 and engaging the spring attacking point must, therefore, retain its resting position. The friction force on the spool 3 leads to a discharge of the original thread rest tension in the portion engaging the securing point 11, whereby the brake effect relative to the spool 2 is appreciably reduced. The friction force at the periphery of the spool 9 follows, therefore, likewise the formula: tread tension (setting itself new and smaller) times $e^{\mu a}$, that means the difference of the thread tension prior to and after the spool 3. During rewinding in a different direction, the operation takes place in the same manner, merely in opposite direction. The spring 12 and 15 and the pin 11 constitute two cooperative brake tension restraining means.

While I have disclosed several embodiments of the present invention, it is to be understood that these embodiments are given by example only and not in a limiting sense, the scope of the present invention being determined by the objects and the claims.

I claim:

1. A magnetic tape magazine comprising
a take-up reel and a feeding reel,
both said reels being disposed in one plane,
each of said reels including a reel body,
a brake band surrounding each of said reel bodies,
one end of said brake band being secured to said magazine,
a spring,
the other end of said brake band being connected with said spring with pretension of the latter,
the sense of direction of said brake relative to the periphery of the reel being chosen such that the direction taken from the securing point to the spring engaging point of said brake band coincides with the direction of rotation of said reel body during unwinding of said magnetic tape disposed thereon.

2. The magazine, as set forth in claim 1, wherein
said brake band surrounds both of said reel bodies,
said magazine has securing means,
one side of said brake band leads from each of said reel bodies to said securing means, and
the other side of said brake band leads from each of said reel bodies to said spring.

3. A magnetic tape magazine, comprising
an enclosed magazine housing having bores and a recording carrier opening,
a take-up reel and a feeding reel operatively disposed in one plane within said enclosed magazine housing and rotatably mounted in said bores,
each of said reels including a reel body comprising two parallel flanges spaced from said housing and defining therebetween a recording carrier winding region,
a recording carrier wound on both said take-up reel and said feeding reel within said recording carrier winding regions thereof and passing therefrom between said reels and through said recording carrier opening of said enclosed magazine housing,
a brake band surrounding both of said reel bodies,
a spring means,
said brake band being secured to said magazine housing and being connected with said spring means with pretension of the latter, and
the sense of direction of said brake relative to the periphery of the reel being chosen such that the direction taken from the securing point to the spring engaging point of said brake band coincides with the direction of rotation of said reel body during unwinding of said recording carrier disposed thereon.

4. The magnetic tape magazine, as set forth in claim 3, wherein
one of said two flanges of each of said reels forms an annular groove outside of said recording carrier winding region,
said brake band surrounding both of said reels disposed in said annular grooves of both of said reels,
means for securing said brake band to said magazine housing at least one position spaced from said reels, and
said spring biasing said brake band in tension about both of said reels and connected to said brake band at a position spaced from said reels.

5. The magnetic tape magazine, as set forth in claim 3, wherein
said brake band has two ends adjacent one another,
said spring means and said securing means constituting two cooperating brake tension restraining means,
one of said two cooperative brake tension restraining means connecting said two ends of said brake band, and
the other of said two cooperative brake tension restraining means operatively connected to a central portion of said brake band.

6. The magnetic tape magazine, as set forth in claim 5, wherein
said one of said two cooperative brake tension restraining means is a pin secured to said enclosed magazine housing and to said two ends of said brake band, and
the other of said two cooperative brake tension restraining means is said spring means and connected in tension between said pin and said central portion of said brake band operating substantially at a right angle to the direction of said brake band between said reels.

7. The magnetic tape magazine, as set forth in claim 5, wherein
said one of said two cooperative rake tension restraining means is said spring means and connected in tension between said two ends of said brake band, and
said other of said two cooperative brake tension restraining means is a pin secured to said enclosed housing and to said central portion of said brake band.

8. The magnetic tape magazine, as set forth in claim 3, wherein
said brake band comprises a thread.

References Cited

UNITED STATES PATENTS 2,675,185 4/1954 Zenner -------------- 242—54

LEONARD D. CHRISTIAN, *Primary Examiner.*